US007453545B2

(12) United States Patent
Kim et al.

(10) Patent No.: US 7,453,545 B2
(45) Date of Patent: Nov. 18, 2008

(54) LIQUID CRYSTAL DISPLAY PANEL

(75) Inventors: Bong-Chul Kim, Daegu (KR); Myung-Woo Nam, Gyoungsangbok-Do (KR); Kyung-Kyu Kang, Gyoungsangnam-Do (KR); Chul-Gu Lee, Gyoungsangbok-Do (KR); Gweon-Young Park, Kyoungsangbuk-Do (KR); Chang-Ho Oh, Daegu (KR); Yun-Rak Lee, Ulsan (KR)

(73) Assignee: LG Display Co., Ltd., Seoul (KR)

( * ) Notice: Subject to any disclaimer, the term of this patent is extended or adjusted under 35 U.S.C. 154(b) by 6 days.

(21) Appl. No.: 10/819,351

(22) Filed: Apr. 7, 2004

(65) Prior Publication Data

US 2005/0001969 A1  Jan. 6, 2005

(30) Foreign Application Priority Data

Apr. 7, 2003 (KR) ............... 10-2003-0021763

(51) Int. Cl.
G02F 1/1339 (2006.01)

(52) U.S. Cl. .................. 349/155; 349/153

(58) Field of Classification Search ........... 349/153, 349/155
See application file for complete search history.

(56) References Cited

U.S. PATENT DOCUMENTS

| | | | | |
|---|---|---|---|---|
| 4,608,558 A | * | 8/1986 | Amstutz et al. | 345/94 |
| 4,983,429 A | * | 1/1991 | Takayanagi et al. | 428/1.53 |
| 5,504,601 A | * | 4/1996 | Watanabe et al. | 349/42 |
| 5,739,888 A | * | 4/1998 | Ogura et al. | 349/153 |
| 5,922,242 A | * | 7/1999 | Saishu et al. | 252/299.62 |
| 6,018,380 A | * | 1/2000 | Hu et al. | 349/153 |
| 6,392,735 B1 | * | 5/2002 | Tani | 349/156 |
| 2003/0016328 A1 | * | 1/2003 | Chung et al. | 349/149 |

FOREIGN PATENT DOCUMENTS

| | | |
|---|---|---|
| JP | 01-234826 | 9/1989 |
| JP | 08-278507 | 10/1996 |
| JP | 09-211473 | 8/1997 |
| JP | 10-325951 | 12/1998 |
| JP | 2000-338474 | 12/2000 |
| JP | 2002-139725 | 5/2002 |

(Continued)

OTHER PUBLICATIONS

Korean Office Action issued on May 15, 2005, corresponding to Korean Patent Application No. 10-2003-0021759.

(Continued)

Primary Examiner—Michael H Caley
(74) Attorney, Agent, or Firm—McKenna Long & Aldridge LLP

(57) ABSTRACT

In a liquid crystal display panel, by controlling the number or a size of a support member added to a seal pattern for attaching two substrate of a liquid crystal display panel to each other, in case that the seal pattern is formed at an upper surface of a black matrix or of an over-coat layer formed of an organic film material, outer air is prevented from flowing into an image display part, and the seal pattern is prevented from being broken, so that it may be minimized that a deficiency occurs in the liquid crystal display panel.

20 Claims, 9 Drawing Sheets

FOREIGN PATENT DOCUMENTS

| | | |
|---|---|---|
| KR | 01-234826 | 9/1989 |
| KR | 10-1997-0016673 | 4/1997 |
| KR | 1019970016673 A | 4/1997 |
| KR | 100142831 B1 | 4/1998 |
| KR | 10-2002-0017189 A | 3/2002 |

OTHER PUBLICATIONS

Korean Office Action issued on Jul. 25, 2005, corresponding to Korean Patent Application No. 10-2003-0021763.

Korean Office Action issued on Jan. 31, 2005, corresponding to Korean Patent Application No. 10-2003-0021763.

* cited by examiner

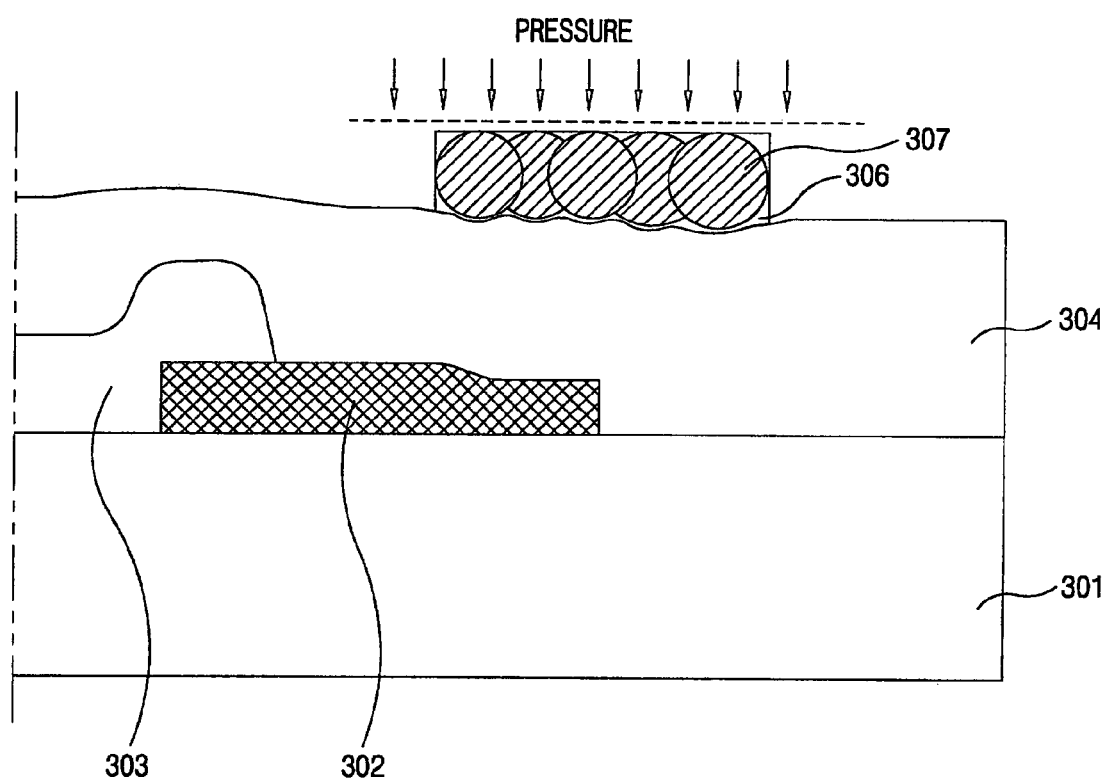

LIQUID CRYSTAL DISPLAY PANEL

This application claims the benefit of the Korean Application No. P2003-021763 filed on Apr. 7, 2003, which is hereby incorporated by reference.

BACKGROUND OF THE INVENTION

1. Field of the Invention

The present invention relates to a liquid crystal display panel, and more particularly, to a liquid crystal display panel capable of preventing air from flowing into an image display part of a liquid crystal display panel where a thin film transistor array substrate and a color filter substrate are attached to each other.

2. Discussion of the Related Art

In general, a liquid crystal display apparatus is a display device where data signals including image information are individually supplied to unit pixels arranged in a matrix form, and the light transmittance of the unit pixels is controlled to display a desired image.

Thus, the liquid crystal display device includes a liquid crystal display panel where the unit pixels are arranged in a matrix form, and a driver integrated circuit (IC) for driving the unit pixels.

In the liquid crystal display panel, a thin film transistor array substrate and a color filter substrate are attached to each other so as to face into each other and have a certain interval (generally, referred to as a cell-gap) therebetween, and, at the cell-gap, a liquid crystal layer is formed.

The thin film transistor array substrate and the color filter substrate are attached to each other by a seal pattern formed along the outer edge of an effective image display part. At this time, on the thin film transistor array substrate or the color filter substrate, a spacer is formed thereby forming a certain cell-gap therebetween.

At outer surfaces of the substrates, a polarizing plate, a retardation plate and the like are installed. Such a plurality of components are selectively constructed thereby varying an advancing state of light and a refraction ratio and thus constructing a liquid crystal display device having a high brightness and a contrast characteristic.

At the liquid crystal display panel where the thin film transistor array substrate and the color filter substrate face into and are attached to each other, a common electrode and a pixel electrode are formed, and apply an electric field to the liquid crystal layer. That is, a voltage applied to the pixel electrode is controlled in a state of applying a voltage to the common electrode, whereby a light transmittance of the unit pixels can be individually controlled. In order to control the voltage applied to the pixel electrode by the unit pixels, a thin film transistor used as a switching device is formed at each unit pixel.

The liquid crystal display device is generally divided into a twisted nematic (TN) mode liquid crystal display panel and an in-plane switching (EPS) mode liquid crystal display panel.

In the TN mode liquid crystal display panel, a pixel electrode is formed on a thin film transistor array substrate unit pixel by unit pixel, and a common electrode is formed at an entire surface of a color filter substrate. Thus, a liquid crystal layer is driven by an electric field between the pixel electrode formed on the thin film transistor array substrate and the common electrode formed on the color filter substrate.

At the IPS mode liquid crystal display panel, a pixel electrode and a common electrode are formed on a thin film transistor array substrate at a certain interval therebetween. Thus, a liquid crystal layer is driven by a horizontal electric field between the pixel electrode and the common electrode formed on the thin film transistor array substrate.

FIG. 1 is an exemplary view illustrating a plane structure of a liquid crystal display panel where the thin film transistor array substrate and the color filter substrate face into and are attached to each other.

In FIG. 1, the thin film transistor array substrate 101 faces into and is attached to the color filter substrate 102, and an edge of one long side thereof and an edge of one short side thereof are protruded compared to the color filter substrate 102.

At a region where the substrates 101 and 102 are attached to each other, an image display part 113 where unit pixels are formed in a matrix form to display an image is provided, and a seal pattern 116 is formed along the outer edge of the image display part 113.

At an edge region of one short side of the thin film transistor array substrate 101 protruded compared to the color filter substrate 102, a gate pad part 114 connected with gate lines of the image display part 113 is provided.

At an edge region of one long side of the thin film transistor array substrate 101 protruded compared to the color filter substrate 102, a data pad part 115 connected with data lines of the image display part 113 is provided.

The gate pad part 114 supplies a scan signal supplied from a gate driver integrated circuit to the gate lines of the image display part 113, and the data pad part 115 supplies image information supplied from a data driver integrated circuit to the data lines of the image display part 113.

On the thin film transistor array substrate 101, the gate lines to which the scan signal is applied, and the data lines to which the image information is applied, intersect one another, so that the unit pixels are defined in a matrix form. At the intersection, a thin film transistor is provided for switching the unit pixel.

On the color filter substrate 102, a red, green or blue color filter corresponding to a unit pixel is provided, and a black matrix is provided to prevent a leakage of light generated from a back-light and prevent a color mixture of the adjacent unit pixels.

In case of the TN mode liquid crystal display panel, a pixel electrode is provided at the thin film transistor array substrate 101, and a common electrode is provided at the color filter substrate 102 to drive a liquid crystal layer. In case of the IPS mode liquid crystal display panel, a pixel electrode and a common electrode are provided at the thin film transistor array substrate 101 to drive a liquid crystal layer.

The thin film transistor array substrate 101 and the color filter substrate 102 are provided with a cell-gap therebetween generated by a spacer so as to be separated from each other, by a constant distance. The substrates are attached to each other by a seal pattern 116 formed at the outer edge of the image display part 113 to form a liquid crystal display panel 100. At one side of the seal pattern 116, a liquid crystal injection hole is provided for injecting liquid crystal between the thin film transistor array substrate 101 and the color filter substrate 102 that are attached to each other. The liquid crystal injection hole is sealed after the injection of the liquid crystal is complete.

The cell-gap between the thin film transistor array substrate 101 and the color filter substrate 102 is constant in the image display part 113, but varies in the region where the seal pattern 116 is formed, because as the sealant is pressed by the pressure generated when the thin film transistor array substrate 101 and the color filter substrate 102 are attached to each other the sealant spreads out.

Accordingly, in order to prevent the cell-gap distance from varying at the seal pattern 116, a glass fiber or a glass ball is added into the sealant as a support member for maintaining the cell-gap. At this time, the glass fiber or the glass ball is added to the sealant at a weight ratio of about 1%.

FIG. 2 is an exemplary view illustrating a sectional structure of a color filter substrate for a region 'A' of FIG. 1 in case of the related IPS art mode liquid crystal display panel.

With reference to FIG. 2, a color filter substrate of an IPS mode liquid crystal display panel includes a black matrix 202 made of a resin material, patterned at a region constantly separated from one end portion of a transparent substrate 201 and at a boundary region of pixels to prevent a leakage of light generated from a back-light, and preventing a color mixture of adjacent pixels; a red, green, or blue color filter 203 formed to partially overlap with the black matrix and correspond to a unit pixel; an over-coat layer 204 formed at an entire surface of an upper portion of the transparent substrate 201 including the black matrix 202 and the color filter 203; and a seal pattern 206 formed at an upper surface of the over-coat layer 204 formed on the edge of the transparent substrate 201 so as to partially overlap with the black matrix 202.

The black matrix 202 formed at the color filter substrate of the IPS mode liquid crystal display panel is made of a resin material.

The over-coat layer 204 is formed on an entire surface of an upper portion of the black matrix 202 and the color filter 203 to planarize a surface. That is, because a black matrix 202 is formed of an organic film such as a resin material and is applied as a thick film, the over-coat layer 204 formed of an organic material prevents a deficiency in driving a liquid crystal layer caused by a step difference occurring at a region where the black matrix 202 and the color filter 203 overlap with each other.

As stated above, a glass fiber or a glass ball is added to the seal pattern 206 as a support member for maintaining a cell-gap at a weight ratio of about 1% to a sealant.

FIG. 3 is an exemplary view illustrating a magnified view of the distribution of glass fiber added at to the seal pattern 206 a weight ratio of about 1%.

In the case in which the seal pattern 206 is formed on an upper surface of a black matrix 202 or over-coat layer 204 the glass fiber added to the seal pattern generates a crack at interfaces between the seal pattern 206 and the over-coat layer 204 and between the over-coat layer 204 and the black matrix 202 when outer pressure is generated in attaching the two substrates, or when the attached substrates are examined in a condition of a high temperature and a high humidity after the attaching process. Because of this, the black matrix 202 or the over-coat layer 204 are depressed, and outer air is flowed into the image display part, thereby occurring the deficiency in the liquid crystal display panel. These will be described in detail with reference to exemplary views of FIGS. 4a and 4b.

FIGS. 4a and 4b illustrate an organic film black matrix 302 formed of a resin material, patterned at a region constantly separated from one end portion of a first transparent substrate 301 and at a boundary region of pixels to prevent a leakage of light generated from a back-light, and preventing a color mixture of adjacent pixels; a red, green or blue color filter 303 formed so as to partially overlap with the black matrix 302 and correspond to a unit pixel; an over-coat layer 304 formed of an organic film and at an entire surface of an upper portion of the first transparent substrate 301 including the black matrix 302 and the color filter 303; a seal pattern 306 formed at an upper surface of the over-coat layer 304 formed on an edge region of the first transparent substrate 301 so as to partially overlap with the black matrix 302; and a glass fiber 307 added to the seal pattern 306, and maintaining a cell-gap at a region where the seal pattern 306 is formed. At this time, the glass fiber 307 has a diameter which is the same as or greater than the cell-gap.

First, as shown in FIG. 4a, in a normal state, the glass fiber 307 added to the seal pattern 306 can maintain a cell-gap by coming in contact with a thin film transistor array substrate (not shown) and the over-coat layer 304 therebetween.

However, as shown in FIG. 4b and as stated above, as the glass ball or the glass fiber 307 is pressed by the outer pressure caused during or after attaching a liquid crystal display panel, the black matrix 302 and the over-coating layer 304 formed of an organic film material are compressed. When the black matrix 302 and the over-coat layer 304 formed of an organic film material are compressed, a crack is generated at an interface between the seal pattern 306 and the over-coat layer 304 and between the over-coat layer 304 and the black matrix 302. Because of this outside air is flowed into an image display part, whereby a deficiency occurs in the liquid crystal display panel, and the seal pattern 306 is broken.

In addition, a crack may be generated at an interface between the seal pattern 306 and the over-coat layer 304 and between the over-coat layer 304 and the black matrix 302 by expansion and contraction according to a temperature of the black matrix 302 and the over-coat layer 304 formed of the organic film material. Because of this outside air flows into the image display part, creating defects in the liquid crystal panel and breaking the seal pattern 306.

As stated above, a glass fiber or a glass ball is added as a support member for maintaining a cell-gap in the seal pattern 306 generally at about 1% of a weight ratio to a sealant and is distributed as shown in an exemplary view of FIG. 3. At this time, 550 or more glass fibers or glass balls are distributed per a unit area of 1 mm×1 mm on the average.

As so far described, in the related art IPS mode liquid crystal display panel, the glass fiber or the glass ball used to maintain the cell-gap between the thin film transistor array substrate and the color filter is added to the seal pattern attaching the thin film transistor array substrate and the color filter substrate at a weight ratio of about 1% to a sealant. Accordingly, when external pressure is generated in attaching the two substrates to each other, or when the attached substrates are examined in a condition of a high temperature and a high humidity after the attaching process, outside air flows into the image display part, causing defects in the liquid crystal display panel or breaking the seal pattern.

SUMMARY OF THE INVENTION

Accordingly, the present invention is directed to a liquid crystal display panel that substantially obviates one or more of the problems due to limitations and disadvantages of the related art.

Therefore, an advantage of the present invention is to provide a liquid crystal display panel capable of preventing air from flowing into an image display part of a liquid crystal display panel when external pressure is generated in or after attaching the liquid crystal display panel, or when the attached panel is examined in a condition of a high temperature and a high humidity.

To achieve these and other advantages and in accordance with the purpose of the present invention, as embodied and broadly described herein, there is provided a liquid crystal display panel according to a first embodiment including at least one organic film on a first substrate; a seal pattern on the organic film; a second substrate attached to the first substrate by the seal pattern; and a support member added to the seal pattern, wherein about 550 or fewer support members are applied in at least one of unit areas of the seal pattern.

To achieve these and other advantages and in accordance with the purpose of the present invention, as embodied and broadly described herein, there is provided a liquid crystal display panel according to a second embodiment including at least one organic film on a first substrate; a seal pattern on the organic film; a second substrate attached to the first substrate by the seal pattern; and a support member added at a weigh ratio of less than about 1% to a sealant of the seal pattern.

To achieve these and other advantages and in accordance with the purpose of the present invention, as embodied and broadly described herein, there is provided a liquid crystal display panel according to a third embodiment including at least one organic film on a first substrate; a seal pattern on the organic film; a second substrate attached to the first substrate by the seal pattern; and a support member added to the seal pattern, wherein a diameter of the support member is smaller than a gap between the first substrate and the second substrate.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIGS. 4a and 4b are exemplary views illustrating a deficiency that occurs with the glass fiber added to a seal pattern in FIG. 3;

DETAILED DESCRIPTION OF THE ILLUSTRATED EMBODIMENTS

Reference will now be made in detail to the illustrated embodiments of the present invention, examples of which are illustrated in the accompanying drawings.

Figure 1:
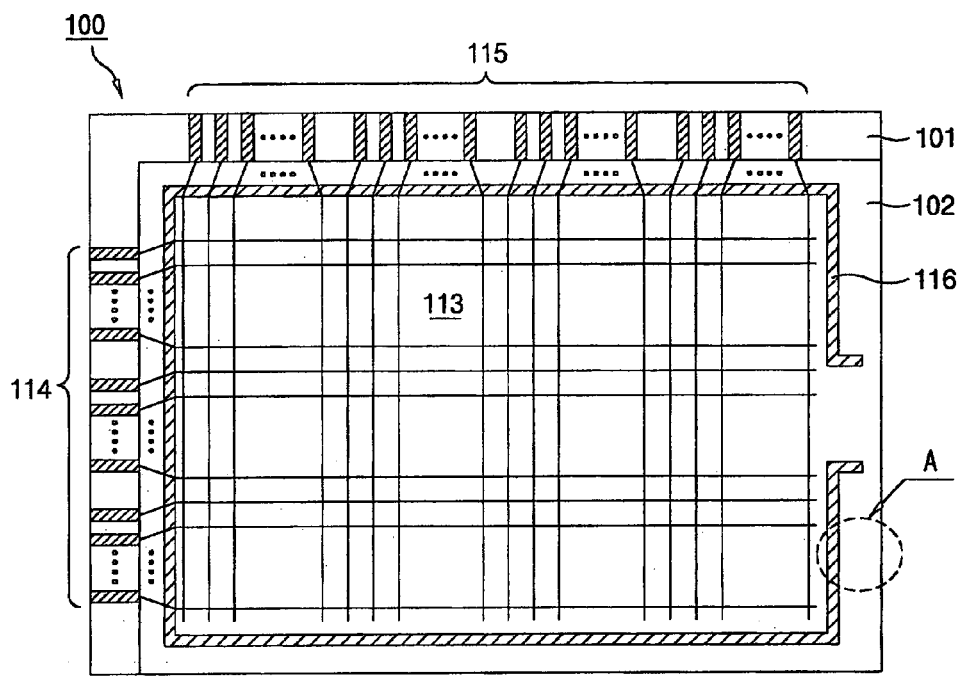
FIG. 1 is an exemplary view illustrating a plane structure of a related art liquid crystal display panel where a thin film transistor array substrate and a color filter substrate face into and are attached to each other.
Figure 2:
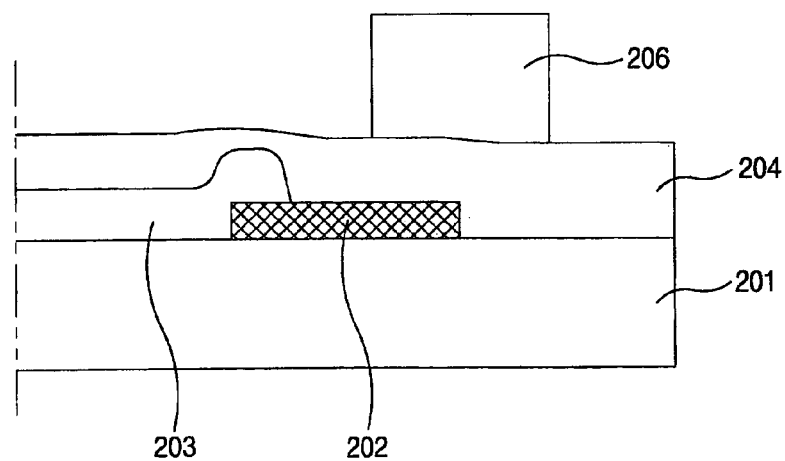
FIG. 2 is sectional view illustrating the color filter substrate for the region 'A' of FIG. 1 in the related art IPS mode liquid crystal display panel.
Figure 3:
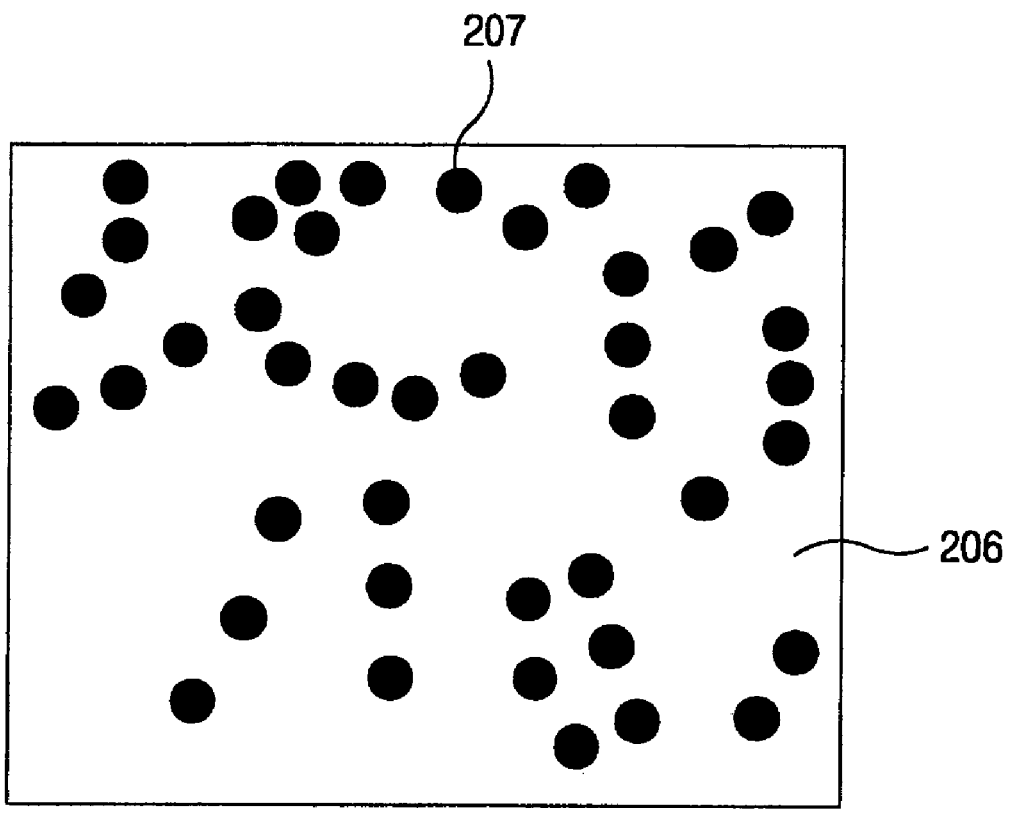
FIG. 3 is an exemplary view illustrating the distribution of glass fiber added in a seal pattern at a weight ratio of about 1% in FIG. 2.
Figure 4A:
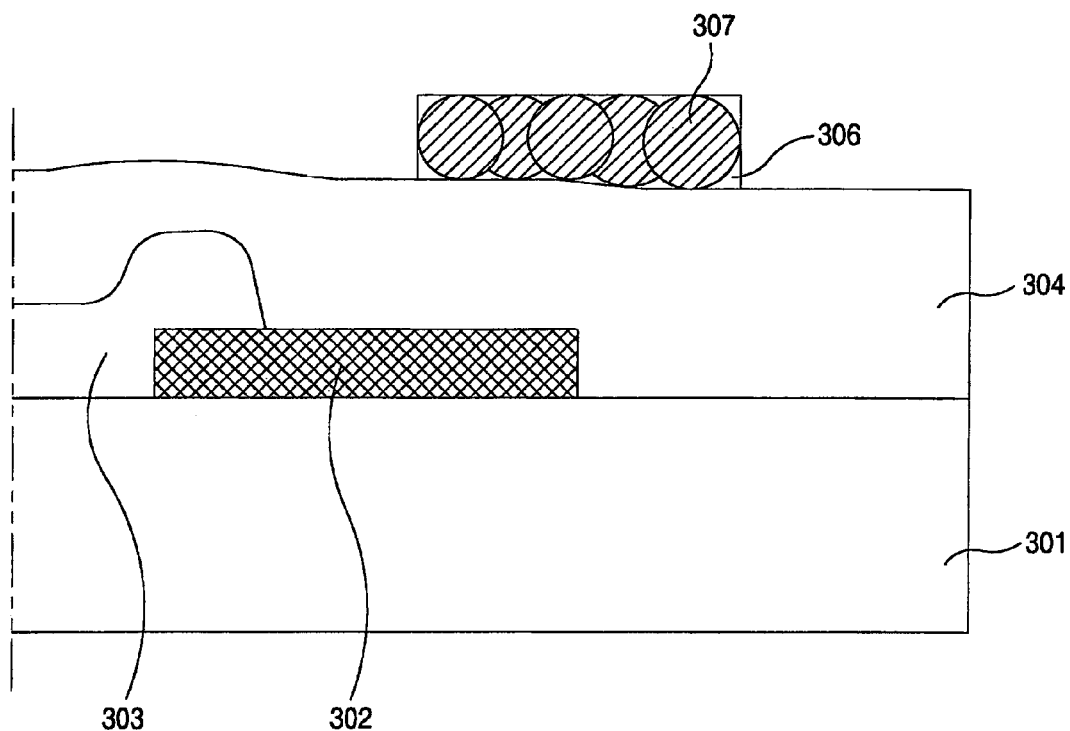
Figure 5:
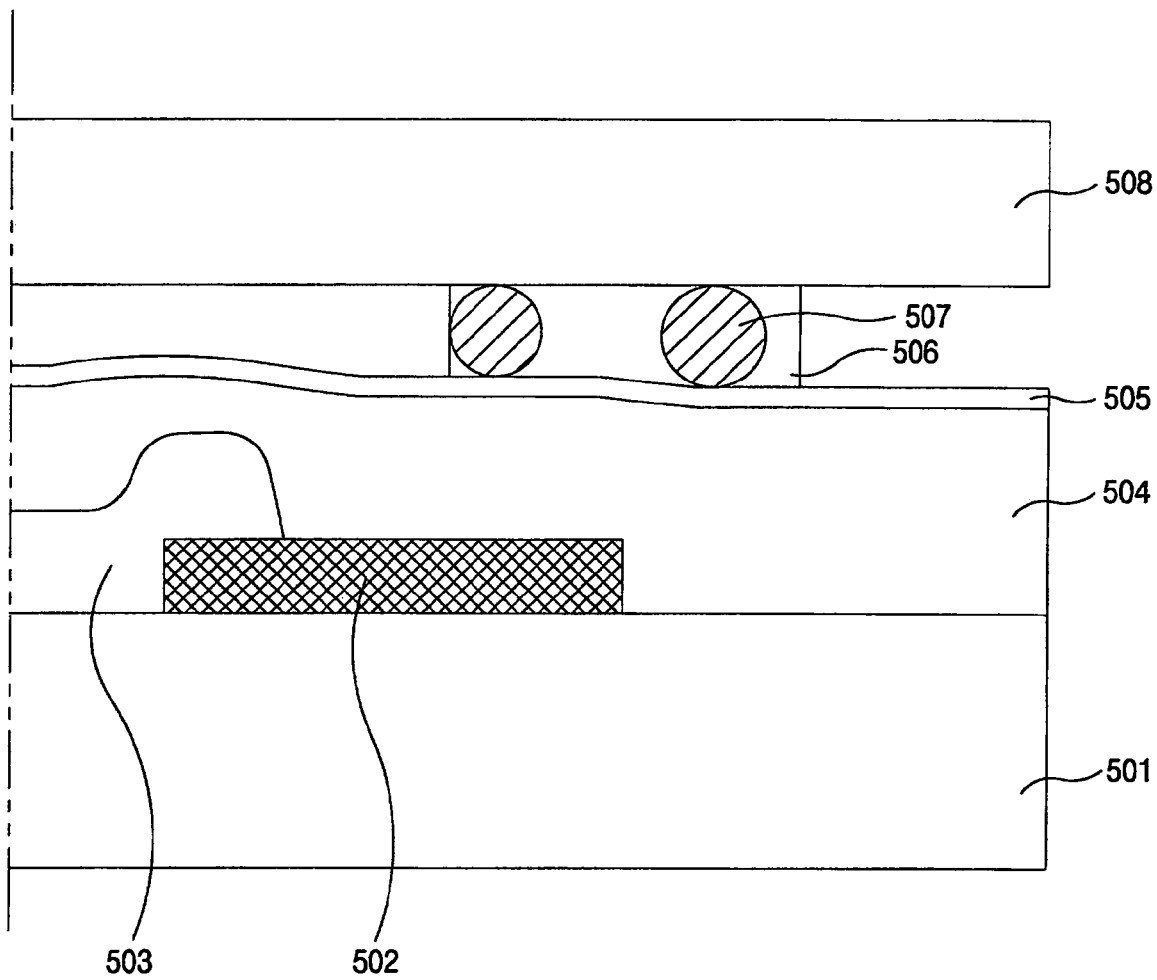
FIG. 5 is an exemplary view illustrating a sectional structure of a TN mode liquid crystal display panel according to a first embodiment of the present invention.

FIG. 5 is an exemplary view illustrating a sectional structure of a liquid crystal display panel according to a first embodiment of the present invention.

With reference to FIG. 5, a liquid crystal display panel includes a black matrix 502 formed of an organic film such as a resin material, patterned at a region separated at a constant distance from one end portion of a first transparent substrate 501 and at a boundary region of pixels to prevent a leakage of light generated from a back-light, and to prevent a mixture of colors from adjacent pixels; a red, green or blue color filter 503 partially overlapping the black matrix 502 and formed to correspond to a unit pixel; an over-coat layer 504 formed at an entire surface of an upper portion of the first transparent substrate 501 including the black matrix 502 and the color filter 503; a common electrode 505 formed at an upper surface of the over-coat layer 504; a seal pattern 506 formed at an upper surface of the common electrode 505 formed on the edge portion of the first transparent substrate 501 so as to partially overlap with the black matrix 502; a support member 507 in a distribution of fewer than about 550 in an unit areas of 1 mm×1 mm of the seal pattern 506; and a second transparent substrate 508 attached to the first substrate 501 by the seal pattern 506.

As stated above, on the first transparent substrate 501, the black matrix 502, a color filter 503, the over-coat layer 504 and the common electrode 505 are formed, and the first transparent substrate 501 is applied as a color filter substrate of a TN mode liquid crystal display panel.

The matrix 502 is formed of an organic material such as a resin material.

The over-coat layer 504 is formed at an entire surface of an upper portion of the black matrix 502 and the color filter 503 to planarize the surface. That is, as a black matrix 502 formed of an organic film such as a resin material is applied as a thick film, the over-coat layer 504 is formed of an organic material in order to prevent a defect caused by a step occurring at a region where the black matrix 502 and the color filter 503 overlap with each other.

On the second transparent substrate 508, gate lines to which the scan signal is applied and data lines to which the image information is applied intersect one another so that the unit pixels are defined in a matrix form. At the intersection, a thin film transistor is provided for switching a unit pixel, and a pixel electrode is provided at the unit pixel, driving a liquid crystal layer with the common electrode 505 formed at the first substrate 501. Thus, the second transparent substrate is applied as a thin film transistor array substrate.

As stated above, the second transparent substrate 508 is applied as the thin film transistor array substrate. It faces and is attached to the first transparent substrate 501 which is applied as the color filter substrate, so that an edge of one long side thereof and an edge of one short side thereof protrudes relative to the first transparent substrate 501. At the edge portion of one short side of the second transparent substrate 508, which protrudes relative to the first transparent substrate 501, a gate pad part connected with the gate lines is provided. At the edge portion of one long side of the second transparent substrate 508, which protrudes relative to the first transparent substrate 501, a data pad part connected with the data lines is provided.

The gate pad part supplies a scan signal from a gate driver integrated circuit to the gate lines formed on the thin film transistor array substrate, and the data pad part supplies image information from a data driver integrated circuit to the data lines formed on the thin film transistor array substrate.

The first transparent substrate 501 and the second transparent substrate 508 constructed as above are uniformly separated from each other by a spacer so that a cell-gap is generated therebetween, are attached to each other by the seal pattern, and thus constitute a liquid crystal display panel. At this time, at a region where the first transparent substrate 501 and the second transparent substrate 508 are separated from each other, a liquid crystal layer is formed. And the seal pattern 506 may be formed at the first transparent substrate 501 or the second transparent substrate 508.

The seal pattern 506 may be formed of various plane shapes depending on a method of forming the liquid crystal layer. The method of forming the liquid crystal layer may be divided into a vacuum injection method and a dropping method.

The vacuum injection method is that a liquid crystal injection hole of a liquid crystal display panel is dipped in a container filed with the liquid crystal in a vacuum chamber, and then the liquid crystal is injected into the liquid crystal display panel by a pressure difference between the inner side and the outer side of the liquid crystal display panel by varying a degree of vacuum. After the liquid crystal is filled in the liquid crystal display panel, the liquid crystal injection hole is sealed to form a liquid crystal layer of the liquid crystal display panel.

The liquid crystal injection hole in the vacuum injection method is defined as an open region of one side of the seal pattern 506. Accordingly, in case of forming a liquid crystal layer on the liquid crystal display panel through the vacuum injection method, a portion of the seal pattern 506 is formed to be open so that it functions as a liquid crystal injection hole.

However, the vacuum injection method as described above has the following problems.

In the vacuum injection method, it takes a long time to fill the liquid crystal in the liquid crystal display panel. In general, the attached liquid crystal display panel with an area of several hundreds square-centimeters ($cm^2$) has a cell gap of a few micrometers ($\mu m$). Thus, even with the vacuum injection method which uses a pressure difference, an injecting amount of the liquid crystal by unit time is quite small. In addition, as the liquid crystal display panel becomes large in size, the time required to fill the liquid crystal is accordingly lengthened and the deficiency in filling the liquid crystal may occur. Therefore, the vacuum injection method cannot be used for a large-scale liquid crystal display panel.

In addition, liquid crystal is much consumed in the vacuum injection method. In general, an actual amount of the liquid crystal is very small compared to the amount of the liquid crystal filled in the container, and when liquid crystal is exposed to the air or a specific gas, it reacts with the gas and becomes degraded. Thus, even if the liquid crystal filled in the container is filled to a plurality of liquid crystal display panels, a large amount of the liquid crystal still remaining after the filling process and such remaining liquid crystal is discarded. As a result, a unit price of the liquid crystal display is increased.

In order to overcome such problems of the vacuum injection method, recently, a dropping method is adopted.

The dropping method is that the liquid crystal is dropped and dispensed at an image display part of the first transparent substrate 501 or the second transparent substrate 508, so that the liquid crystal is uniformly distributed at the entire image display part by the generated when the first transparent substrate 501 and the second transparent substrate 508 are attached to each other, thereby forming a liquid crystal layer.

In case of forming the liquid crystal layer through the dropping method, the liquid crystal is not filled from the outside but directed dropped on the substrate. Thus, the seal pattern 506 is formed to have a closed pattern shape to encompass the outer edge of the image display part in order to prevent an external leakage of the liquid crystal from the image display part.

In the dropping method, the liquid crystal may be dropped within a short time compared to the vacuum injection method. Thus, for a large-sized liquid crystal display panel, a liquid crystal layer can be quickly formed between the substrates.

In addition, since only a required amount of the liquid crystal is dropped on the substrate, the unit price of the liquid crystal display panel as in the vacuum injection method can be kept low.

Unlike the vacuum injection method, the first transparent substrate 501 and the second transparent substrate 508 are attached to each other after the liquid crystal layer is formed in the dropping method.

In the dropping method, if the seal pattern 506 is formed of a thermo-hardening sealant, the seal may flow out in subsequent process of attaching the first transparent substrate and the second transparent substrate, whereby the dropped liquid crystal may be contaminated. Accordingly, in the dropping method, a ultraviolet (UV)-hardening sealant may be used for a seal pattern 506, or a mixture of the ultraviolet-hardening sealant and the thermo-hardening sealant may be used.

In the first transparent substrate 501 and the second transparent substrate 508 as described above, a constant cell-gap therebetween is maintained at a region where a spacer is formed. But at a region where the seal pattern 506 is formed, the sealant is pressed and widely spreads by pressure caused in or after attaching the first transparent substrate 501 and the second transparent substrate 508 to each other, thereby varying the cell-gap.

Accordingly, in order to prevent the cell-gap from being varied, a glass fiber or a glass ball is added to the seal pattern 506 as a support member 507 for maintaining the cell-gap.

In a liquid crystal display panel according to a first embodiment of the present invention fewer than about 500 support members 507 are distributed in at least one unit areas of 1 mm×1 mm of the seal pattern 506. A spherical or cylindrical glass fiber or a glass ball with a diameter of about ±1 $\mu m$ relative to the cell-gap between the first transparent substrate 501 and the second transparent substrate 508 may be used as the support member 507. In addition, because the cylindrical glass fiber has a length of about 20 $\mu m$, coagulation thereof may be reduced when compared to the spherical shaped glass ball. Furthermore, about 200 or fewer glass fibers may be distributed in at least one of unit areas of 1 mm×1 mm.

In addition, the number of support members 507 may be varied according to a specific gravity or a weight ratio of the support member.

In the case of adding the spherical glass ball, its diameter depends on the size of a spacer, and is the same as or greater than the cell-gap. For instance, when the spacer is 4.8 $\mu m$, in general, the glass ball with a diameter of about 3.8 to about 7.5 $\mu m$ is used. Two hundred to about 550 spherical glass balls may be distributed in at least one unit areas of 1 mm×1 mm of the seal pattern 506. The inventors have determined that a defect ratio is about 0% when about 0.01 to about 200 glass balls are distributed, a defect ratio is about 10% when about 350 or fewer glass balls are distributed, a defect ratio is about 30% when about 450 or fewer glass balls are distributed, a defect ratio is about 40% when about 500 or fewer glass balls are distributed, a defect ratio is about 50% when about 550 or fewer glass balls are distributed.

In the case of adding the cylindrical glass fiber, its diameter depends on the size of the spacer, and is the same as or greater than the cell-gap. For instance, when the spacer is 4.8 μm, in general, the glass fiber with a diameter of between about 3.6 to about 7.5 μm is used, and has a length of about 20 μm. About thirty to about 200 spherical glass fibers may be distributed in at least one unit area of 1 mm×1 mm of the seal pattern 506. For instance, the inventors have determined that when using glass fiber having a diameter of about 5.2 μm and a length of about 20 μm, a defect ratio is about 0% when about 0.001 to about 78 glass fibers are distributed, a defect ratio is about 10% when about 100 or fewer glass fibers are distributed, a defect ratio is about 40% when about 150 or fewer glass balls are distributed, and a defective ratio is 50% when about 200 or fewer glass balls are. distributed.

The number of the cylindrical glass fibers may be varied according to a diameter or a length thereof. For example, on the assumption that about 100 glass fibers with a length of about 20 μm are distributed in at least one unit area of 1 mm×1 mm of the seal pattern 506, if the length thereof is 10 μm, then about 200 glass fibers are distributed, and if the length thereof is 5 μm, then about 450 glass fibers may be distributed.

In the related art, a glass ball is added to the seal pattern 506 at a weight ratio of about 1% to a sealant, and on the average over about 550 glass balls per unit area of 1 mm×1 mm are distributed. In the case of adding the glass fiber, in the related art over about 200 glass fibers are distributed. Accordingly, in the case that that the seal pattern 506 is formed at an upper surface of a black matrix 502 or of an over-coat layer 504 formed of an organic film material, when external pressure is generated during or after attaching the two substrates to each other, or when the attached substrates are examined in a condition of a high temperature and a high humidity after the attaching process, regions where a common electrode 505 is damaged by the glass fiber or the glass balls and regions where cracks are generated at an interface between the seal pattern 506 and the over-coat layer 504 or between the over-coat layer 504 and the black matrix 502 are densely and widely distributed across the entire seal pattern. For this reason, outside air flows into the image display part whereby the deficiency occurs in the liquid crystal display panel.

However, in the liquid crystal display panel according to a first embodiment of the present invention, a smaller number of support members is distributed across the seal pattern 506 in comparison to the related art. Accordingly, in the case that that -the seal pattern 506 is formed at an upper surface of a black matrix 502 or an over-coat layer 504, when external pressure is generated in or after attaching the two substrates, or when the attached substrates are examined in a condition of high temperature and high humidity after the attaching process, regions where the common electrode is damaged by the support member 507 and regions where cracks are generated at an interface between the seal pattern 506 and the over-coat layer 504 or between the over-coat layer 504 and the black matrix 502 occur rarely across the entire seal pattern 506, and are distributed locally. For this reason, outside air may be prevented from flowing into the image display part, and the seal pattern 506 may be prevented from being broken.

The black matrix is formed of a colored organic film resin such as acryl, epoxy, polyimide resin or the like including at least one of a black organic pigment and a carbon-black material. The over-coat layer 504 may be formed of acryl, epoxy, polyimide resin or the like. The black matrix 502 may be extended from one end portion of the first transparent substrate 501 or the second transparent substrate 508 to a region where the seal pattern 506 is formed (not shown).

FIG. 5 has been described in reference to a TN mode liquid crystal display panel in which a common electrode 505 is formed on the first transparent substrate to produce a color filter substrate. However, the first embodiment of the present invention may be applied to an IPS mode liquid crystal display panel at which the common electrode 505 is formed on the second transparent substrate 508 produced as a thin film transistor array substrate.

Figure 6:
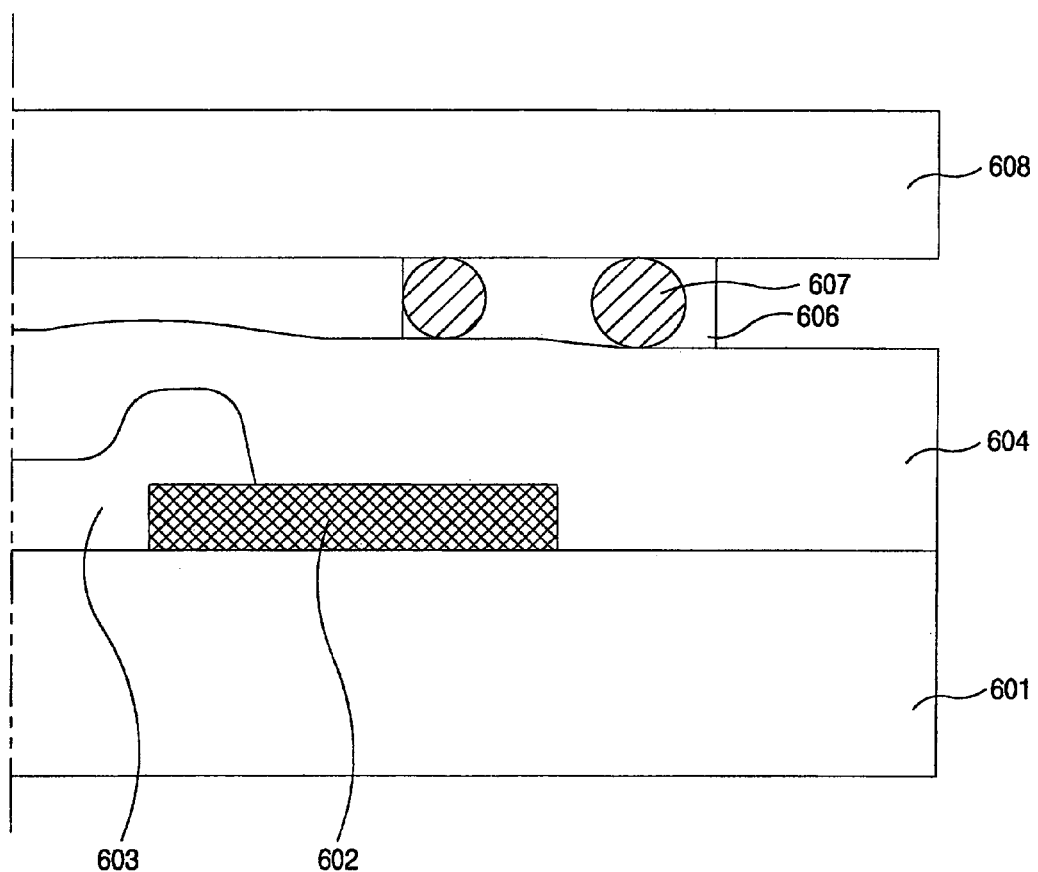
FIG. 6 is a sectional view illustrating an IPS mode liquid crystal display panel according to one embodiment of the present invention.

FIG. 6 is an exemplary view illustrating a sectional structure of a color filter substrate of an IPS mode liquid crystal display panel.

With reference to FIG. 6, a black matrix 602, a color filter 603 and an over-coat layer 604 are formed in the same manner as those in FIG. 5 except a common electrode 505 of FIG. 5. A seal pattern 606 is formed at an upper surface of the over-coat layer 604 formed on the edge portion of the first transparent substrate 601 so as to partially overlap with the black matrix 602. About five hundred-fifty or fewer support members are distributed in at least one unit area of 1 mm×1 mm in the seal pattern 606, and the second transparent substrate 608 is attached to the first transparent substrate 601 by the seal pattern 606.

As described above, the black matrix 602, the color filter 603 and the over-coat layer 604 are formed on the first transparent substrate 601. The first transparent substrate 601 is applied as a color filter substrate of the IPS mode liquid crystal display panel.

The black matrix 602 is formed of an organic film such as a resin material.

The over-coat layer 604 is formed at an entire surface of upper portions of the black matrix 602 and the color filter 603 to make the surface even. That is, as a black matrix 602 formed of an organic film such as a resin material is applied as a thick film, the over-coat layer 604 is formed of an organic material in order to prevent defects in driving a liquid crystal layer caused by a step deficiency occurring at a region where the black matrix 602 and the color filter 603 overlap with each other.

On the second transparent substrate 608, gate lines to which a scan signal is applied and data lines to which image information is applied intersect one another, defining a matrix of unit pixels. At each intersection, a thin film transistor for switching the unit pixel is provided, and, at the unit pixel, a common electrode and a pixel electrode for driving a liquid crystal layer are provided. The second transparent substrate is applied as a thin film transistor array substrate of the IPS mode liquid crystal display panel.

The first transparent substrate 601 and the second transparent substrate 608 are separated at a uniform distance constant and by a spacer to generate a cell-gap therebetween. The substrates are attached to each other by the seal pattern 606 to form a liquid crystal display panel. A liquid crystal layer is formed at a region where the first transparent substrate 601 and the second transparent substrate 608 are separated from each other. The seal pattern 606 may be formed at the first transparent substrate 601 or the second transparent substrate 608.

In the case of forming a liquid crystal layer through a vacuum injection method, one portion of the seal pattern 606 is formed open so that it functions as a liquid crystal injection hole. In the case of forming a liquid crystal layer through a dropping method, the seal pattern is formed to have a closed pattern shape to encompass the outer edge of the image display part.

In the first transparent substrate 601 and the second transparent substrate 608 as described above, a constant cell-gap is maintained at a region where a spacer is formed. But, at a region where the seal pattern 606 is formed, external pressure generated during or after attaching the first transparent substrate 501 and the second transparent substrate 508 to each other, presses the sealant and spreads it out thereby varying the cell-gap. For the spacer, a ball spacer or a column spacer may be used. The column spacer is formed by forming an organic film such as acryl or BCB (BenzoCycloButene), and patterning the formed organic film through a photolithography process.

Accordingly, in order to prevent the cell-gap from varying a glass fiber or a glass ball is added in the seal pattern 606 as a support member 607 for maintaining the cell-gap.

In the IPS mode liquid crystal display panel according to a first embodiment of the present invention, 550 or fewer support members 607 are distributed in at least one unit area of 1 mm×1 mm of the seal pattern. A spherical or cylindrical glass fiber or glass ball having a diameter of about ±1 mm compared to the cell gap between the first transparent substrate or the second transparent substrate may be used as the support member 607. Because since a cylindrical glass fiber has a length of about 20 µm, coagulation of the fibers may be reduced in comparison to coagulation that occurs with spherical shaped spaces. About two hundred or fewer glass fibers may be distributed in at least one unit area of 1 mm×1 mm.

In addition, the number of support members 607 may be varied according to a specific gravity or a weight ratio of the support member.

In the case of adding the spherical glass ball, the diameter of the ball is the same as or greater than the cell-gap distance. For instance, when the spacer is 4.8 µm, the glass ball with a diameter of about 3.8 to about 7.5 µm is used. In the case of using such a spherical glass ball, between about 200 and about 550 spherical glass balls may be distributed in at least one unit area of 1 mm×1 mm of the seal pattern 606. It has been observed by present inventors that a defect ratio is about 0% when between about 0.01 and about 200 glass balls are distributed, a defect ratio is about 10% when about 350 or fewer glass balls are distributed, a defect ratio is about 30% when about 450 or fewer glass balls are distributed, a defect ratio is about 40% when about 500 or fewer glass balls are distributed, a defect ratio is about 50% when about 550 or fewer glass balls are distributed.

On the other side, in the case of adding the cylindrical glass fiber, the diameter of the fiber is the same as or greater than the cell-gap. For instance, when the spacer is 4.8 µm, the glass fiber with a diameter of between about 3.6 and about 7.5 µm and a length of about 20 µm is used. In case of using such a spherical glass fiber, between about 30 and about 200 spherical glass fibers may be distributed in at least one unit area of 1 mm×1 mm of the seal pattern 606. For instance, the present inventors have determined that in the case that the glass fibers have a diameter of about 5.2 µm and a length of about 20 µm, a defect ratio is about 0% when between 0.001 and 78 glass fibers are distributed, a defect ratio is about 10% when about 100 or fewer glass balls are distributed, a defect ratio is about 40% when about 150 or fewer glass balls are distributed, and a defect ratio is about 50% when about 200 or fewer glass balls are distributed.

The number of the cylindrical glass fiber may be varied according to a diameter or a length thereof. For example, on the assumption that about 100 glass fibers with a length of about 20 µm are distributed in at least one unit area of 1 mm×1 mm of the seal pattern 606, in case that the length thereof is 10 µm, about 200 glass fibers are distributed, and in case that the length thereof is 5 µm, about 450 glass fibers may be distributed.

In the related art, a glass ball is added to the seal pattern 606 at a weight ratio of about 1% to a sealant, and over about 550 glass balls per a unit area of 1 mm×1 mm on the average are distributed. In case of adding glass fiber in the related art, over about 200 glass fibers are distributed. Accordingly, in the case that the seal pattern 606 is formed at an upper surface of a black matrix 602 or an over-coat layer 604 formed of an organic film material, when external pressure is generated during or after attaching the two substrates to each other, or when the attached substrates are examined in a condition of a high temperature and a high humidity after the attaching process, regions where cracks are generated at an interface between the seal pattern 606 and the over-coat layer 604 or between the over-coat layer 604 and the black matrix 602 are densely and widely distributed throughout the entire seal pattern 606. For this reason, outside air flows into the image display part thereby generating defects in the liquid crystal display panel.

However, in the IPS mode liquid crystal display panel according to a first embodiment of the present invention, fewer support members are distributed at the seal pattern 606 in comparison to the related art. Accordingly, in the case that that the seal pattern 606 is formed at an upper surface of a black matrix 602 or an over-coat layer 604 formed of an organic film material, when external pressure is generated during or after attaching the two substrates to each other, or when the attached substrates are examined in a condition of a high temperature and a high humidity after the attaching process, regions where cracks are generated at an interface between the seal pattern 606 and the over-coat layer 604 or between the over-coat layer 604 and the black matrix 602 are sparsely scattered throughout the entire seal pattern 606, thereby preventing outside air from flowing into the image display part and preventing the seal pattern 606 from breaking.

The black matrix is formed of a colored organic film resin such as acryl, epoxy, polyimide resin or the like including at least one of a black organic pigment and a carbon-black material. The over-coat layer 604 may be formed of acryl, epoxy, polyimide resin or the like. The black matrix 602 may be extended from one end portion of the first transparent substrate 601 or the second transparent substrate 608 to a region where the seal pattern 606 is formed (not shown).

In a liquid crystal display panel according to a second embodiment of the present invention, a support member 507, 607 for maintaining a gap between a first transparent substrate 501, 601 and a second transparent substrate 508, 608 is added to a seal pattern 506, 606 at a weight ratio of less than about 1% to sealant at TN mode and IPS mode liquid crystal display panels having the structure illustrated in FIGS. 5 and 6 stated above.

As described above, when each of the support members 507, 607 is added to the seal pattern 506, 606 at a weight ratio of less than about 1% to the sealant, about 550 or fewer support members 507, 607 are distributed in at least one unit area of 1 mm×1 mm of the seal pattern 506, 606. Therefore, the TN mode and IPS liquid crystal display panels according to the second embodiment of the present invention achieve the same result as those according to the first embodiment of the present invention.

Figure 7:
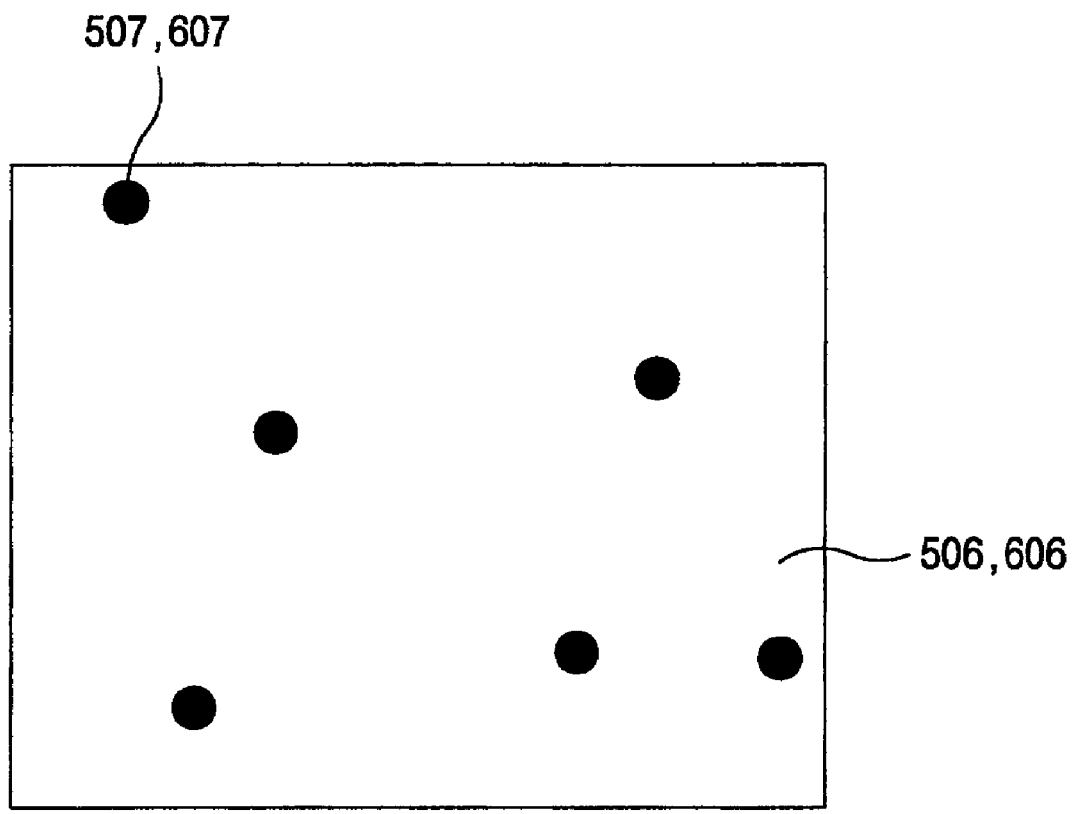
FIG. 7 is an exemplary view illustrating the distribution of glass fiber added in a seal pattern at a weight ratio of about 0.1% in FIGS. 5 and 6 according to a second embodiment of the present invention.

FIG. 7 is an exemplary view illustrating a distribution state of a support member 507, 607 added in the seal pattern 506, 606 at a weight ratio of about 0.1% to a sealant. In case of adding a spherical glass ball as a support member, between about 20 and 55 support members 507, 607 added in the seal pattern 506, 606 at a weight ratio of about 0.1%, may be distributed in at least one unit area of 1 mm×1 mm of the seal pattern 506, 606. And, in case of adding a cylindrical glass fiber as a support member, between 5 and 20 support members 507, 607 may be distributed in at least one unit area of 1 mm×1 mm of the seal pattern 506, 606. But, a weight ratio of the support member 507, 607 may be changed according to a weight of the support member, and even if there is about one support member in 100 mm×100 mm, the support member does not affect a liquid crystal display panel. Accordingly, in case of adding the glass fiber, between about 0.01 and 75 glass fibers may be distributed, and in case of adding the glass ball, between about 0.01 and about 200 glass balls may be distributed.

The support member 507, 607 added to the seal pattern 506, 706 may be added at weight ratio from about 0.95% to as little as about 0.005% of the sealant.

Figure 8:
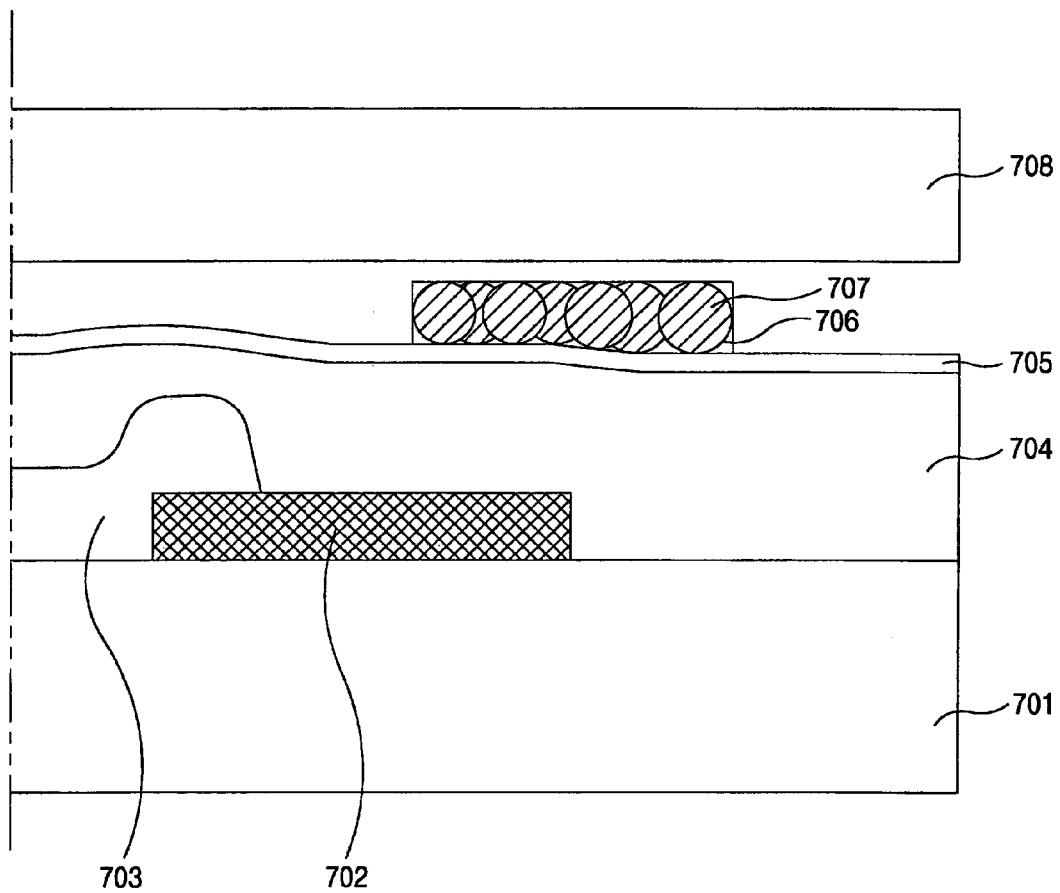
FIG. 8 is a sectional view illustrating a TN mode liquid crystal display panel according to a third embodiment of the present invention.

FIG. 8 is an exemplary view illustrating a sectional structure of a liquid crystal display panel according to a third embodiment of the present invention.

With reference to FIG. 8, a liquid crystal display panel according to the third embodiment of the present invention, includes a black matrix 702 formed of an organic film such as a resin material, patterned at a region constantly separated from one end portion of a first transparent substrate 701 and at a boundary region of pixels to prevent a leakage of light generated from a back-light, and preventing a colors from adjacent pixels from mixing; a red, green or blue color filter 703 partially overlapping with the black matrix 702, and formed to correspond a unit pixel; an over-coat layer 704 formed at an entire surface of an upper portion of the first transparent substrate 701 including the black matrix 702 and the color filter 703; a common electrode 705 formed at an upper surface of the over-coat layer 704; a seal pattern 706 formed at an upper surface of the common electrode 705 formed on an edge portion of the first transparent substrate 701 so as to partially overlap with the black matrix 702; and a second transparent substrate 708 attached to the first transparent substrate 701 by the seal pattern; and a support member 707 added to the seal pattern in order to maintain a cell-gap between the first transparent substrate 701 and the second transparent substrate 708, and whose diameter is smaller than the cell-gap between the first transparent substrate 701 and the second transparent substrate 708.

The black matrix is formed of a colored organic film resin such as acryl, epoxy, polyimide resin or the like including at least one of a black organic pigment and a carbon-black material. The over-coat layer 704 may be formed of acryl, epoxy, polyimide resin or the like.

The cell-gap of about 5 μm between the first transparent substrate 701 and the second transparent substrate 708 is constantly and uniformly maintained. Accordingly, a diameter of the support member 707 according to the third embodiment of the present invention is smaller than 5 μm. A glass fiber or a glass ball with a diameter of about 3.8 μm may be used as the support member. And, a glass fiber or a glass ball with a diameter of about 1 μm less than the cell-gap may be used as the support member.

In a liquid crystal display panel according to the third embodiment of the present invention, in a normal state, a spacer having a length of about 5 μm and the support member 707 come in contact with the second transparent substrate 708 and the common electrode 705 therebetween. Even in the case that outer pressure is generated, because the diameter of the support member 707 is about 3.8 μm, which is smaller compared to the height of the spacer, the outer pressure is dispersed so that it may be minimized that the black matrix 702 and an over-coat layer 704 formed of an organic material are depressed.

Accordingly, the common electrode 705 may be prevented from being broken, or cracks may be prevented from occurring at interfaces between the over-coat layer 704 and the common electrode 705, between the common electrode 705 and the over-coat layer 704 and between the over-coat layer 704 and the black matrix 702. Therefore, outside air may be prevented from flowing into an image display part, and the seal pattern 706 may be prevented from being broken.

Above-mentioned FIG. 8 illustrates a TN mode liquid crystal display panel where a common electrode 705 is formed on a first transparent substrate 701 produced as a color filter substrate. But, the third embodiment could be applied to an IPS mode liquid crystal display panel where a common electrode is formed on the second transparent substrate 708 produced as a thin film transistor array substrate.

Figure 9:
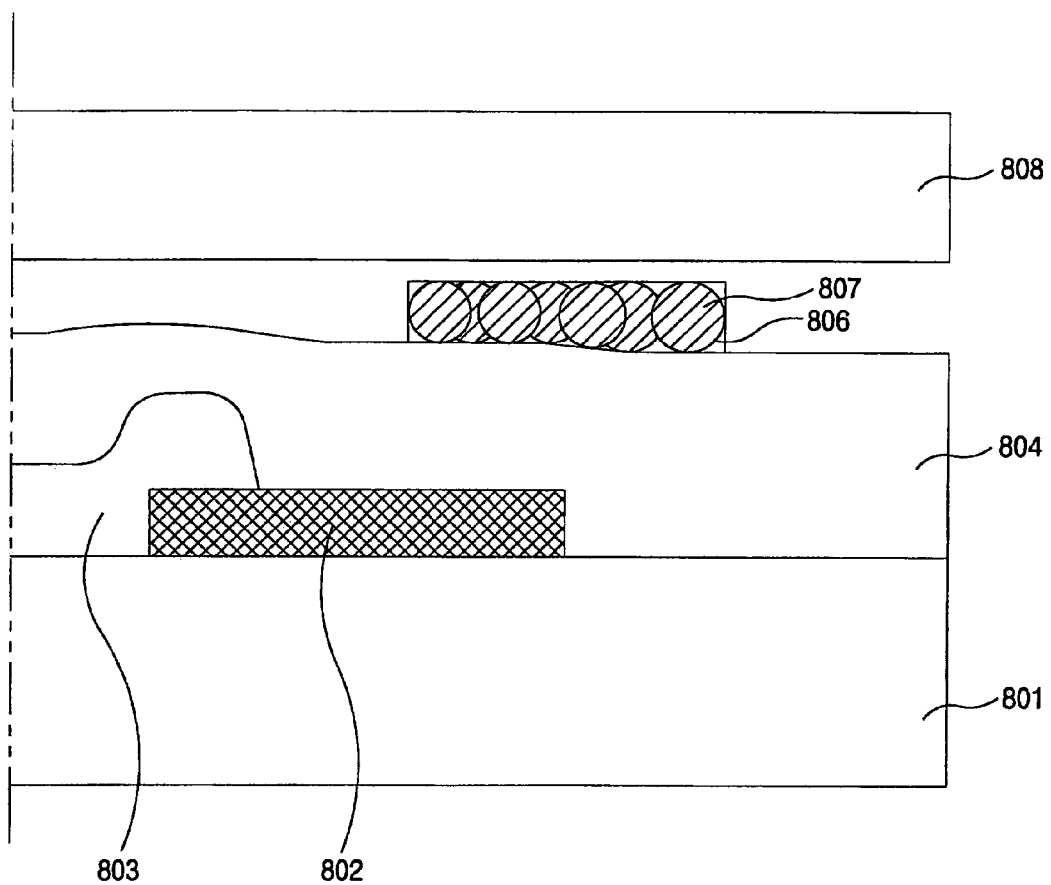
FIG. 9 is a sectional view illustrating an IPS mode liquid crystal display panel according to a third embodiment of the present invention.

FIG. 9 is an exemplary view illustrating a sectional structure of a color filter substrate of an IPS mode liquid crystal display panel.

In FIG. 9, a black matrix 802, a color filter 803 and an over-coat layer 804 are formed on a first transparent substrate 801 in the same manner as those in the exemplary view of FIG. 8 except a common electrode 705. A seal pattern 806 is formed at an upper surface of the over-coat layer 804 formed on an edge portion of the first transparent substrate 801 so as to partially overlap with the black matrix 802. In addition, the black matrix 802 may be formed to be extended from one end portion of the first transparent substrate 801 or of a second transparent substrate 808 to a region where the seal pattern 806 is formed (not shown).

A uniform cell-gap of about 5 μm between the first transparent substrate 801 and the second transparent substrate 808 is constantly maintained. Accordingly, the diameter of the support member 807 according to the third embodiment of the present invention is smaller than 5 μm. A glass fiber or a glass ball with a diameter of about 3.8 μm may be used as the support member. And, a glass fiber or a glass ball with a diameter of about 1 μm less than the cell-gap may be used as the support member.

In an IPS mode liquid crystal display panel according to the third embodiment of the present invention, in a normal state, a spacer having a length of about 5 μm and the support member 807 come in contact with the second transparent substrate 708 and the common electrode 705 therebetween. Even in case that outer pressure is generated, since the diameter of the support member 807 is about 3.8 μm, which is smaller compared to the height of the spacer, the outer pressure is dispersed so that it may be minimized that the black matrix 802 and an over-coat layer 804 formed of an organic material are depressed.

Accordingly, a crack may be prevented from occurring at interfaces between the over-coat layer 804 and the seal pattern 806 and between the over-coat layer 804 and the black matrix 802, thereby preventing the outer air from flowing into an image display part and a break of the seal pattern 806.

As so far described, in a liquid crystal display panel according to the present invention, in the case that a seal pattern is formed at an upper surface of a black matrix or of an over-coat layer formed of an organic film material, outside air may be prevented from flowing into an image display panel, so that a break of the seal pattern may be prevented, adhesion of the seal pattern and an organic material is enhanced, and defects in the liquid crystal display panel minimized. Accordingly, a yield thereof may be improved, and thus the cost of a product may be reduced.

It will be apparent to those skilled in the art that various modifications and variations can be made in the liquid crystal display panel of the present invention without departing from the spirit or scope of the inventions. Thus, it is intended that the present invention covers the modifications and variations of this invention provided they come within the scope of the appended claims and their equivalents.

What is claimed is:

1. A liquid crystal display panel, comprises:
   a black matrix on a first substrate;
   a color filter on the first substrate corresponding to a pixel region;
   an overcoat layer on the black matrix and the color filter, wherein the overcoat layer is organic;
   a seal pattern on the overcoat layer;
   a second substrate attached to the first substrate by the seal pattern;
   a spacer between the first substrate and the second substrate to maintain uniformly a cell gap therebetween; and
   a support member added to the seal pattern,
   wherein about 550 or fewer support members are applied in at least one unit area of 1 mm×1 mm of the seal pattern and the support members of the seal pattern is smaller than the cell gap between the first and second substrate in the pixel region.

2. The liquid crystal display panel of claim 1, wherein the black matrix is formed of a resin material.

3. The liquid crystal display panel of claim 2, wherein the black matrix is extended to a region where the seal pattern is formed.

4. The liquid crystal display panel of claim 1, wherein the seal pattern is formed on the edge portion of the substrate so as to partially overlap with the black matrix.

5. The liquid crystal display panel of claim 1, wherein the black matrix and the over-coat layer are laminated.

6. The liquid crystal display panel of claim 1, further comprising a common electrode formed at an upper surface of the organic film, wherein the seal pattern is formed at an upper surface of the common electrode.

7. The liquid crystal display panel of claim 1, wherein the support member is a glass ball.

8. The liquid crystal display panel of claim 1, wherein the support member is a glass fiber.

9. The liquid crystal display panel of claim 1, wherein the support member is added to the seal pattern at a weight ratio of about 1% of support member to sealant of the seal pattern.

10. The liquid crystal display panel of claim 1, wherein a diameter of the support member is within about 1 μm of the gap.

11. A liquid crystal display panel, comprises:
    a black matrix on a first substrate;
    a color filter on the first substrate corresponding to a pixel region;
    an overcoat layer on the black matrix and the color filter, wherein the overcoat layer is organic;
    a seal pattern on the overcoat layer;
    a second substrate attached to the first substrate by the seal pattern;
    a spacer between the first substrate and the second substrate to maintain uniformly a cell gap therebetween; and
    a support member added to the seal pattern,
    wherein the support members are added to the seal pattern at a weight ratio of less than 1% to a sealant of the seal pattern and the support members of the seal pattern is smaller than the cell gap between the first and second substrate in the pixel region.

12. The liquid crystal display panel of claim 11, wherein the black matrix is made of a resin material.

13. The liquid crystal display panel of claim 12, wherein the black matrix is extended to a region where the seal pattern is formed.

14. The liquid crystal display panel of claim 11, wherein the seal pattern is formed on the edge portion of the substrate so as to partially overlap with the black matrix.

15. The liquid crystal display panel of claim 11, wherein the black matrix and the over-coat layer are laminated.

16. The liquid crystal display panel of claim 11, further comprising a common electrode on the organic film, wherein the seal pattern is formed at an upper surface of the common electrode.

17. The liquid crystal display panel of claim 11, wherein the support member is a glass fiber.

18. The liquid crystal display panel of claim 11, wherein the support member is a glass ball.

19. The liquid crystal display panel of claim 11, wherein the support member is added to the seal pattern at a weight ratio of between about 0.005% to about 0.95% of a sealant of the seal pattern.

20. The liquid crystal display panel of claim 11, wherein a diameter of the support member is within about 1 μm of the gap.

* * * * *